United States Patent [19]

Jackson

[11] 4,170,254
[45] Oct. 9, 1979

[54] TIRE WITH A STRAIGHT SIDEWALL

[75] Inventor: William L. Jackson, Sutton Coldfield, England

[73] Assignee: Dunlop Limited, London, England

[21] Appl. No.: 790,151

[22] Filed: Apr. 22, 1977

Related U.S. Application Data

[63] Continuation of Ser. No. 603,808, Aug. 12, 1975, abandoned.

[30] Foreign Application Priority Data

Aug. 23, 1974 [GB] United Kingdom ............... 37159/74

[51] Int. Cl.² .............................................. B60C 19/00
[52] U.S. Cl. ........................... 152/353 R; 152/354 R; 152/361 R
[58] Field of Search ............... 152/323–329, 152/353 R, 353 C, 209 WT, 158, 352, 361 R, 361 FP, 361 DM, 330 C, 354

[56] References Cited

U.S. PATENT DOCUMENTS

| | | | |
|---|---|---|---|
| 1,397,795 | 11/1921 | Clifford-Earp | 152/329 |
| 1,815,507 | 7/1931 | Harter | 152/323 |
| 3,018,809 | 1/1962 | Bernard | 152/41 |
| 3,805,868 | 4/1974 | Tangorra | 152/353 C |
| 3,831,657 | 8/1974 | Dillenschneider | 152/361 FP |
| 3,842,884 | 10/1974 | Bertrand | 152/361 DM |
| 3,895,668 | 7/1975 | Tangorra | 152/353 C |
| 3,911,987 | 10/1975 | Takusagawa | 152/330 RF X |

FOREIGN PATENT DOCUMENTS 2194579 3/1974 France .
2219022 9/1974 France .

OTHER PUBLICATIONS

Abstract for French Patent 2,148,019, dated 25 Jul. 1972.

Primary Examiner—Joseph F. Peters, Jr.
Assistant Examiner—D. W. Underwood
Attorney, Agent, or Firm—Stevens, Davis, Miller & Mosher

[57] ABSTRACT

A tire and wheel assembly in which the tire tread is wider than any other part of the tire and is reinforced by an inextensible annular structure. The tire sidewalls are substantially straight in cross section and are maintained in a precompressed state between tread and rim when mounted on the rim.

44 Claims, 12 Drawing Figures

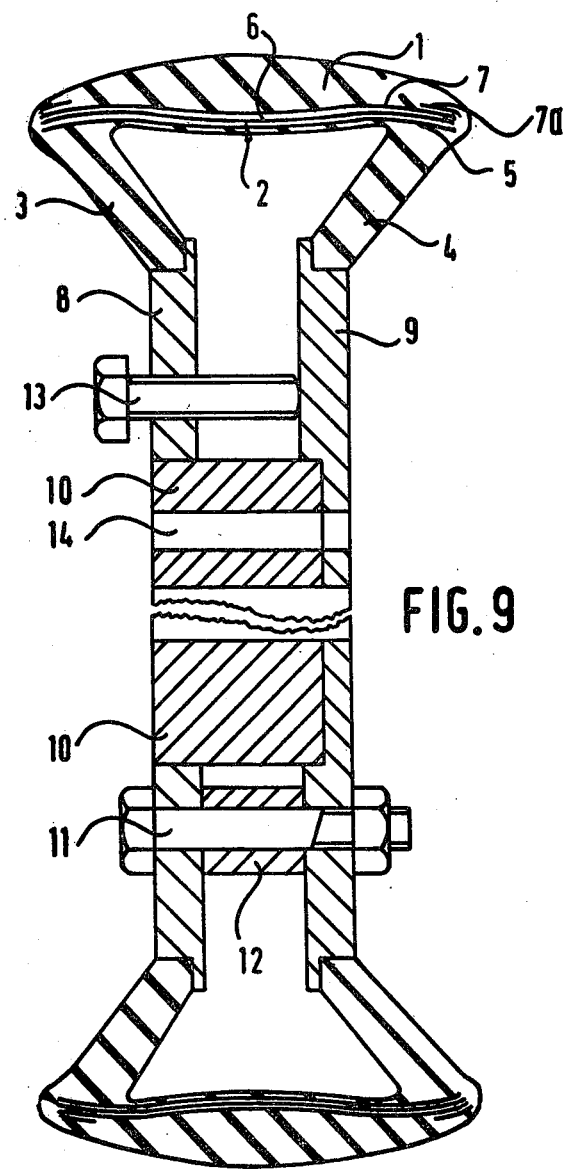

TIRE WITH A STRAIGHT SIDEWALL

This is a Continuation of application Ser. No. 603,808 filed Aug. 12, 1975, now abandoned.

This invention relates to tires.

According to the invention a tire and wheel assembly comprises a tire having a tread portion and a pair of sidewall portions terminating in bead portions to seat on a rigid wheel rim, a rigid wheel rim having a pair of seats for the bead portions of the sidewalls of the tire. The tire tread portion is reinforced over substantially the whole of its width by a substantially inextensible reinforcing structure and has an axial width greater than the remainder of the tire. The sidealls comprise elastomeric material, and extend, in cross-section, radially and axially outwardly in a substantially straight line between the wheel rim and the tread portion of the tire, said sidewalls are in a compressed state with the tire mounted on its rim and having a ratio of thickness to length sufficient for the straight configuration to be maintained in the compressed state.

It will be appreciated that for a body of elastomeric material to remain straight under compression its thickness must be above a minimum value relative to its length, otherwise the body is in a more stable elastic state in a curved configuration and will move to this configuration when subject to the smallest side force. For a simple rectangular body this ratio is approximately 1 to $3\frac{1}{2}$ but the actual value varies with the shape and material of the body. Suffice it to say that the ratio for a particular shape of body can be determined by simple experiment.

The tire is basically a non-pneumatic tire, having as a consequence certain advantages including, in particular, the advantage that it is not subject to sudden failure through puncturing. However, in some circumstances the provision of an inflation pressure in the tire may improve its performance provided that the design of the tire and the pressure used are such that the pressure will not be sufficient to de-compress the rubber of the sidewalls.

The tread portion of the tire is preferably reinforced by means of a belt comprising a plurality of plies of substantially inextensible cords e.g. of steel or rayon. A very wide range of belt constructions may be utilized, different constructions having particular virtues in particular applications. The belt may for example consist of a pair of plies of steel cords having equal and opposite bias angles in the range 10° to 80°. Alternatively the belt may contain three plies, one having a bias angle of 90° and the others equal and opposite angles in the range 10° to 45°. The belt preferably extends axially at least to, and more preferably beyond the section midlines of the sidewalls at the junction of the sidewalls with the tread. The section midline of the sidewall is a line equidistant from the interior and exterior surfaces of the sidewall when viewed in cross-section.

In most cases it will also be necessary to provide extra reinforcement at the edges of the belt to restrain the radial component of the forces produced by the sidewall compression, i.e., circumferentially inextensible reinforcing means. Means for this could take the form of folded ply edges or extra, narrow, biased strips of cord fabric or parallel 0° windings round the edges of the belt.

It should be appreciated that although the construction of the belt is similar to that of the belt in the well-known radial type of tire there are differences of function. Firstly the pre-compressed sidewalls in the present tire necessitate extra edge-reinforcement and secondly a large lateral component of force implies a need for a lateral belt modulus higher than usual. This in turn leads the use of higher bias angles for the belt plies or of 90° plies.

The tread of the tire is axially wider than the remainder of the tire and the sidewalls, when viewed in section, preferably extend from the wheel rim to the tread at an angle in the range 25° to 70° to the rotational axis, more preferably 40° to 50°.

The sidewalls may consist wholly of rubber, preferably a rubber harder than the tread rubber; preferably do not include beads of the conventional kind in which an inextensible reinforcing core is provided. The amount of compression in the sidewalls when the tire is mounted on its wheel rim is preferably in the range 5% to 20% of the original linear length of the sidewall.

Preferably each sidewall is provided with a portion of reduced stiffness, e.g. thinner than the remainder of the sidewall, either adjacent the edge of the tread reinforcement or adjacent the wheel rim, and more preferably two such portions, one in each location.

The invention will now be described in more detail by way of example with reference to the accompanying sketches of which:

FIGS. 6 to 8a show various possible sidewall cross-sectional shapes for a tire of the kind shown in FIG. 5;

FIG. 9 is a cross-sectional view of a tire in accordance with the invention mounted on its wheel rim.

Figure 1:
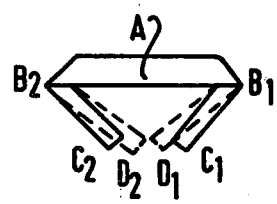
FIG. 1 is a simplified diagrammatic cross-sectional view of a tire in accordance with the invention.

FIG. 1 shows a simplified sketch of a cross-section of a tire which is to be assumed to be mounted on a rim. A represents the cross-section of the tread region which is to be reinforced by a substantially inextensible belt running round the circumference of the tire. $B_1C_1$ and $B_2C_2$ show the positions of the sidewalls when mounted on the rim whereas $B_1D_1$ and $B_2D_2$ show the positions before mounting. Since $B_1D_1$ and $B_2D_2$ are longer than $B_1C_1$ and $B_2C_2$ the shortening of the sidewall from D to C during the operation of mounting on a rim (or wheel) precompresses the sidewall.

It will be appreciated that lateral movement from D to C is only one way of shortening the sidewalls and others can be envisaged which would also result in a precompressed sidewall. Thus radial, lateral or combined radial and lateral movement outward of the inward edge of the sidewalls would compress the sidewall. The lateral movement is preferred because it is mechanically simple. Further alternatives arise if the outer edge of the sidewall is moved radially or laterally inwardly e.g. by separately making and precuring oversized sidewalls which are then forcibly fitted inside a precured belt.

Thus in the tire of this invention the stress in the sidewall is achieved by mechanical precompression of the sidewalls, without need of inflation. Inflation pressure in the tire may thus be very much reduced relative to conventional pneumatic tires or completely eliminated. The risk therefore of the tire bursting can be completely eliminated.

Figure 2:
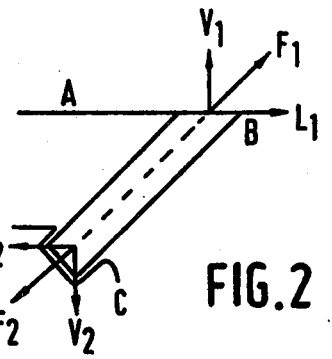
FIG. 2 is a diagram showing the stresses generated at the ends of the sidewalls of the tire of FIG. 2 by pre-compression.

FIG. 2 shows the stresses F exerted by the precompressed sidewall on the rim at its inner edge and on the reinforced tread A at its other edge. $F_1$ is not exactly equal and opposite to $F_2$ because it acts round the outer circumference which is longer than the inner. $F_1$ can be resolved into two components, $V_1$ acts radially outwardly and is restrained by the hoop tension in the tread reinforcement, $L_1$ acts laterally outwards and is restrained by the transverse tension across the tread reinforcement.

Figure 3A:
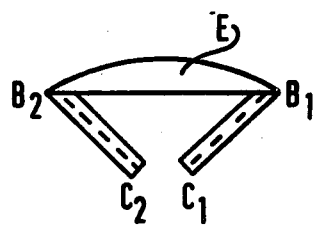
FIG. 3a is a similar view to FIG. 1 but shows a tire having a tread portion which is thicker at its center than at its edges.
Figure 3B:
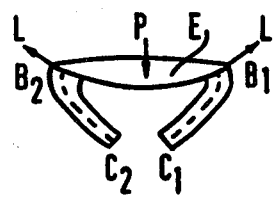
FIG. 3b is a diagram showing the behavior of the tire of FIG 3a under load.

This tension can be made to perform a useful function. As described so far the tire without inflation pressure in contact with a flat surface would carry all load on the two edges of the contact. A more uniform contact is obtained if required by using a tread layer E which is thicker in the middle than at the edges as shown in FIG. 3a. FIG. 3b shows diagrammatically how this deforms in contact with a flat surface. The tensioned belt extending between $B_2$ and $B_1$ develops a transverse curvature, concave outwards, which allows it to support a contact pressure P. If the radius developed is R then the contact pressure is determined by an equilibrium equation of the well known general type $$P = \frac{L}{R}$$

The detailed choice of the tread thickness profile, and hence of R, will depend on the particular application and is determined by known means.

The ability of the center of the cross-section to carry load may be further enhanced by the use of a precompressed inner lining as described in U.S. Pat. No. 4,091,856 of May 30, 1978.

It may also be increased by the use of air pressure inside the tire, although the pressure should not be so high that its loss gave rise to any dangerously noticeable loss of tire properties. There is a further limitation on the scale of any pressure used to be described later.

Figure 4A:
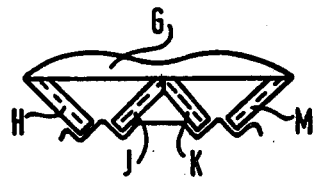
FIG. 4a is a simplified diagrammatic cross-sectional view of a tire having auxiliary internal "sidewalls"
Figure 4B:
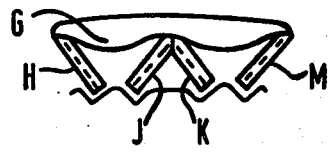
FIG. 4b is a diagram showing the behavior of the tire of FIG. 4a under load.

A further method which may be used to generate a contact pressure more evenly distributed across the width of the tire entails the provision of auxiliary internal "sidewalls" or struts as shown in FIG. 4a in which the tire consists of a reinforced tread portion G having a twin-hump profile and four "sidewalls" H, J, K and M. It would then be necessary to modify the distribution of tread thickness still further to give the result shown in FIG. 4b when in contact with the ground.

It is noticeable in FIG. 3b that when deflected the sidewalls develop an outwardly directed flexure. Such a flexure woudl give rise to an extension of the outer surface. This extension could be undesirable for two reasons. Firstly, if it exceeded the precompression of the compound it could give rise to an accelerated growth of fatigue cracks. Secondly, rotation of the tire under load gives rise to a cyclic variation of strain as each point of the tire rolls through the contact patch; hysteresis of the materials would result in heat generation and since the sidewalls are necessarily thick this could give rise to unacceptable high temperatures.

Figure 5:
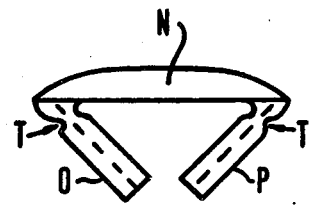
FIG. 5 is a simplified diagrammatic cross-sectional view of a tire having thinned regions in its sidewalls.

To minimize these effects it is advantageous to modify the shape of the sidewall to facilitate the necessary flexure by provision of a "hinge" region which is to be thinner as in the tire shown in FIG. 5 which consists of a reinforced tread portion N, and two sidewalls O and P each having a thinned or "hinge" region T. This sidewall shape has three virtues. The surface extension is reduced, the precompression is locally increased and the reduced thickness allows heat to escape more easily.

Figure 6:
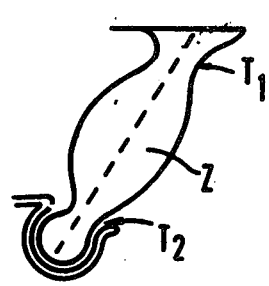

Similar considerations may apply at the radially innermost edge of the sidewall and clearly the material at the shoulders of the hinge, "S", serves little purpose and thus it is reasonable to consider a sidewall Z of smoother cross-sectional shape having two thinned regions $T_1T_2$ as shown in FIG. 6. A very wide range of shapes of this kind is possible.

There is a second restriction on the inflation pressure. Any pressure used must not be so great as to cause sufficient curvature of the sidewall that buckling is caused. Any pressure used in the tire will urge the sidewalls outwardly and thus tend to cause a sidewall curvature convex outwards. This is permissible subject to two restrictions.

1. The curvature must not cause buckling of the sidewall.
2. The curvature must not cause any part of the sidewall to be extended sufficiently to remove the precompression.

Figure 7:
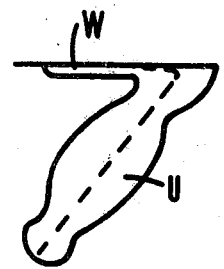

The strength of the joint between sidewall and reinforced tread portion can be increased by increasing the area of the junction. The sidewall U shown in FIG. 7 with a flange W at its radially outer edge is a means to this end. This entails a distortion of the section mid-line of the sidewall at its extreme end, but since the thickness of the sidewall at the flange is very much greater than in the remainder of the sidewall the slight distortion of the midline is functionally insignificant.

Figure 8A:
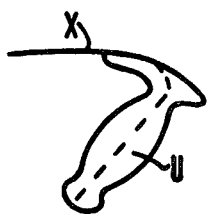
Figure 8B:
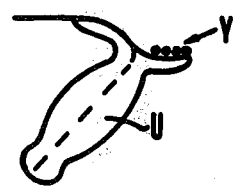
FIG. 8b is a diagram showing a modified tire of the type shown in FIG. 5 in which a circumferential restraining ring is provided at the edge of the tread reinforcement.

The performance of this junction can also be improved by the use of a tread reinforcement X having a reduced diameter at the edges as shown in FIG. 8a. In the tire shown in FIG. 8b this shape has been further modified to allow the use of a hoop of circumferential reinforcing cords Y around the edge of the reinforcing belt. The function of these cords Y is to make sure that the precompression of the sidewall is not reduced by growth, i.e., extension, of the tread reinforcement at its edge under, for example, centrifugal forces generated in fast running.

All the sketches described above show sidewalls whose section midline (dotted line) is at an angle of 45° to the rotational axis. 45°±5° is a preferred direction for reasons associated with the elastic stability of the sidewall. However particular tire uses may require designs having other angles and variation of the angle through a wide range is possible without departing from the basic parameters of the invention.

The tire shown in FIG. 9 consists of a tread portion 1, reinforced by an annular belt assembly 2, and a pair of sidewalls 3 and 4.

The belt assembly consists of three plies 5, 6 and 7, plies 5 and 6 having equal and opposite bias angles in the range 15° to 30°, and ply 7 having a bias angle of 90° with respect to the tire mid-circumferential plane. The cords of the plies 5, 6 and 7 are steel cords, although they may be of other high modulus material such as the recently available aromatic polyamide cord. At the edges of the belt assembly on the ply 7 are located several turns of steel cord 7a having a bias angle of 0°.

The sidewalls 3 and 4 are straight, consist wholly of rubber and have a ratio of thickness to length which is 3.33 to 1 at their radially innermost ends and 3.1 to 1 at their radially outermost ends the sidewalls being slightly tapered in cross-section.

The tire manufacture is a relatively simple process, the belt structure being initially built up from its constituent plies in a conventional manner, and, if desired, partially cured to give it more stability. The belt is then placed on a segmented rigid core and inserted into a transfer or injection mould. Uncured rubber compound is then forced into the mould to form the remainder of the tread portion and the sidewalls, and finally the tire is cured. The mould is opened and the tire removed, the segmental core then being removed from the tire.

The tire is mounted on a wheel rim consisting of a pair of annular plate members 8 and 9, and a center 10. Each of the annular plates has at its periphery a bead seat which consists of two faces, one axially outwardly facing surface extending in a plane inboard of the bead portion of the sidewall and one radially outwardly facing surface.

The plate members 8 and 9 are clamped together by a plurality of nuts and bolts 11, on which are located spacers 12 between the plates. One plate member 8 also contains a plurality of threaded holes in which can be located jacking screws 13 which can be used to force the plate members apart.

To mount the tire on the rim firstly the two plate members are inserted into the tire with the bolts 11 loosely in position to align the holes in the plate members. The bead portions of the tire sidewalls are located on the bead seats and the plate members forced apart, to compress the tire sidewalls, by means of the jacking screws 13. The bolts 11 may then be removed, the spacers 12 inserted through the wheel center, the bolts 11 replaced, the jacking screws removed and the bolts 11 used to clamp the plate members firmly together on the spacers. The wheel center 10 is inserted when it is desired to clamp the wheel to a vehicle, stud holes 14 being provided for this purpose.

Tires and wheels of this construction have been manufactured and tested and have been found to satisfactorily carry substantial loads without need of inflation pressure, the compression in the sidewalls retaining the tire in position on the wheel. It is envisaged, however, that it is preferable to provide a short flange on the wheel axially outwardly of the bead seat to reduce the likelihood of road dirt penetrating between the tire and wheel and to further reduce the possibility of dislodgement of the bead portion of the sidewall from its seat.

Having now described by invention—What I claim is:

1. A tire and wheel rim assembly, operable without pneumatic pressure in said tire, said tire having in cross-section:
   (a) a tread portion defining the outer periphery of the tire and a pair of sidewalls of a harder material than said tread portion extending axially and radially inwardly therefrom and terminating in bead portions for seating on a rigid wheel rim, the section midline of each sidewall being substantially straight, the tread portion having an axial width greater than the remainder of the tire so as to define a tire having a generally triangular cross-section;
   (b) a laterally inextensible reinforcing belt under substantially the entire width of the tread portion;
   (c) the thickness of the tire between the belt and the outer periphery being greater at the central area of the tread than at its edges and the belt never being outwardly convex toward the tread so that the edges of the belt will move toward each other when the belt is deflected by contact with the ground;
   (d) circumferentially inextensible reinforcement means located radially outwardly of the sidewalls and the inner surface of the belt and at least adjacent each edge of the belt to restrain radial expansion of the sidewalls when said tire is mounted on the rigid wheel rim; and
   (e) the rigid wheel rim having a pair of seats for the bead portions of the sidewalls, said rim being sized with respect to the bead portions so as to result in compression of the sidewalls between the rim and the circumferentially inextensible reinforcement means when the tire is mounted on the rim by seating the bead portions on the bead seats, thereby maintaining the belt in tension in the axial direction of the tire since the reinforcing means are located radially outwardly of the sidewalls and the inner surface of the belt and at least adjacent each edge of the belt, said sidewalls having a ratio of thickness to length sufficient for their straight configuration to be maintained in their compressed state.

2. A tire and wheel rim assembly as in claim 1, wherein said circumferentially inextensible reinforcement means is located between said tread and each sidewall.

3. A tire and wheel rim assembly as in claim 1, wherein said sidewalls have a ratio of thickness to length of 1 to $3\frac{1}{2}$.

4. A tire and wheel rim assembly as in claim 1, wherein said belt comprises a plurality of plies of substantially inextensible cords.

5. A tire and wheel rim assembly as in claim 4, wherein said belt comprises a pair of plies of steel cords having equal and opposite bias angles in the range of 10° to 80°.

6. A tire and wheel rim assembly as in claim 1, wherein said belt has three plies, one ply having a bias angle of 90° and the other plies having equal and opposite angles in the range of 10° to 45°.

7. A tire and wheel rim assembly as in claim 1, wherein said circumferentially inextensible reinforcement means comprises folded-ply edges.

8. A tire and wheel rim assembly as in claim 1, wherein said circumferentially inextensible reinforcement means comprises narrow biased strips of cord fabric.

9. A tire and wheel rim assembly as in claim 1, wherein said circumferentially inextensible reinforcement means comprises parallel 0° windings of cord around the edges of said belt.

10. A tire and wheel rim assembly as in claim 1, wherein the sidewalls are inclined at an angle in a range of 25° to 70° to the rotational axis of said tire.

11. A tire and wheel rim assembly as in claim 10, wherein said angle is in the range of 40° to 50° to the rotational axis of said tire.

12. A tire and wheel rim assembly as in claim 1, wherein the sidewalls and tread are of elastomeric material.

13. A tire and wheel rim assembly as in claim 12, wherein the elastomeric material of the tread is rubber.

14. A tire and wheel rim assembly as in claim 1, wherein each sidewall is provided with a portion of reduced stiffness near at least one of its ends.

15. A tire and wheel rim assembly as in claim 1, wherein the amount by which said sidewalls are compressed when said tire is mounted on said rim is in the range of 5 to 20% of the uncompressed length of the sidewalls.

16. A tire operable without pneumatic pressure in said tire, said tire having in cross-section:
    (a) a tread portion defining the outer periphery of the tire and a pair of sidewalls of a harder material than said tread portion extending axially and radially inwardly therefrom and terminating in bead portions for seating on a rigid wheel rim, the section midline of each sidewall being substantially straight, the tread portion having an axial width greater than the remainder of the tire so as to define a tire having a generally triangular cross-section;
    (b) a laterally inextensible reinforcing belt under substantially the entire width of the tread portion;
    (c) the thickness of the tire between the belt and the outer periphery being greater at the central area of the tread than at its edges and the belt never being outwardly convex toward the tread so that the edges of the belt will move toward each other when the belt is deflected by contact with the ground;
    (d) circumferentially inextensible reinforcement means located radially outwardly of the sidewalls and the inner surface of the belt and at least adjacent each edge of the belt to restrain radial expansion of the sidewalls when said tire is mounted on the rigid wheel rim;
    (e) said tire being mountable on a rigid wheel rim which has a pair of seats for the bead portions of the sidewalls, said rim being sized with respect to the bead portions so as to result in compression of the sidewalls between the rim and the circumferentially inextensible reinforcement means when the tire is mounted on the rim by seating the sidewall beads on the bead seats of the rim, thereby maintaining the belt in tension in the axial direction of the tire since the reinforcing means are located radially outwardly of the sidewalls and the inner surface of the belt and at least adjacent each edge of the belt, said sidewalls having a ratio of thickness to length sufficient for their straight configuration to be maintained in their compressed state.

17. A tire as in claim 16, wherein said circumferentially inextensible reinforcement means is located between said tread and each sidewall.

18. A tire as in claim 16, wherein said sidewalls have a ratio of thickness to length of 1 to 3½.

19. A tire as in claim 16, wherein said belt comprises a plurality of plies of substantially inextensible cords.

20. A tire as in claim 19, wherein said belt has a pair of plies of steel cords having equal and opposite bias angles in the range of 10° to 80°.

21. A tire as in claim 16, wherein said belt has three plies, one ply having a bias angle of 90° and the other plies having equal and opposite angles in the range of 10° to 45°.

22. A tire as in claim 16, wherein said circumferentially inextensible reinforcement means comprises folded-ply edges.

23. A tire as in claim 16, wherein said circumferentially inextensible reinforcement means is comprised of narrow biased strips of cord fabric.

24. A tire as in claim 16, wherein said circumferentially inextensible reinforcement means comprises parallel 0° windings of cord around the edges of said belt.

25. A tire as in claim 16, wherein the sidewalls are inclined at an angle in a range of 25° to 70° to the rotational axis of said tire.

26. A tire as in claim 25, wherein said angle is in the range of 40° to 50° to the rotational axis of said tire.

27. A tire as in claim 16, wherein the sidewalls and tread are of elastomeric material.

28. A tire as in claim 27, wherein the elastomeric material of the tread is rubber.

29. A tire as in claim 16, wherein each sidewall is provided with a portion of reduced stiffness near at least one of its ends.

30. A tire as in claim 16, wherein the amount by which said sidewalls are compressed when said tire is mounted on said rim is in the range of 5 to 20% of the uncompressed length of the sidewalls.

31. A tire, operable without pneumatic pressure and mountable on a rigid wheel rim, comprising:
    (a) a tread having a convex outer surface;
    (b) a reinforcing belt beneath said tread, the tread-facing surface of said reinforcing belt being outwardly non-convex, said reinforcing belt being substantially inextensible in the direction of the axis of said tire;
    (c) substantially straight sidewalls extending inwardly from beneath from said tread toward said rim so as to define a tire having a generally triangular cross-section, said sidewalls being of harder material than said tread;
    (d) circumferentially inextensible reinforcement means located radially outwardly of the sidewalls and the inner surface of the belt and at least adjacent each edge of the belt to restrain radial expansion of the sidewalls when said tire is mounted on the rigid wheel rim;
    (e) the length of said sidewalls and the size of said rim being such that, after mounting said tire on said rim, each sidewall is compressed between said rim and said circumferentially inextensible reinforcing means, thus creating and maintaining said reinforcing belt in tension in the axial direction of said tire since the reinforcing means are located radially outwardly of the sidewalls and the inner surface of the belt and at least adjacent each edge of the belt, said sidewalls having a ratio of thickness to length sufficient for their straight configuration to be maintained in their compressed state.

32. A tire as in claim 31, wherein said sidewalls have a ratio of thickness to length of 1 to 3½.

33. A tire as in claim 31, wherein said belt comprises a plurality of plies of substantially inextensible cords.

34. A tire as in claim 33, wherein said belt has a pair of plies of steel cords having equal and opposite bias angles in the range of 10° to 80°.

35. A tire as in claim 31, wherein said belt has three plies, one ply having a bias angle of 90° and the other plies having equal and opposite angles in the range of 10° to 45°.

36. A tire as in claim 31, wherein said circumferentially inextensible reinforcement means comprises folded-ply edges.

37. A tire as in claim 31, wherein said circumferentially inextensible reinforcement means is comprised of narrow biased strips of cord fabric.

38. A tire as in claim 31, wherein said circumferentially inextensible reinforcement means comprises parallel 0° windings of cord around the edges of said belt.

39. A tire as in claim 31, wherein the sidewalls are inclinded at an angle in a range of 25° to 70° to the rotational axis of said tire.

40. A tire as in claim 39, wherein said angle is in the range of 40° to 50° to the rotational axis of said tire.

41. A tire as in claim 31, wherein the sidewalls and tread are of elastomeric material.

42. A tire as in claim 41, wherein the elastomeric material of the tread is rubber.

43. A tire as in claim 31, wherein each sidewall is provided with a portion of reduced stiffness near at least one of its ends.

44. A tire as in claim 31, wherein the amount by which side sidewalls are compressed when said tire is mounted on said rim is in the range of 5 to 20% of the uncompressed length of the sidewall.

* * * * *